(12) United States Patent
Hodge et al.

(10) Patent No.: US 7,499,232 B2
(45) Date of Patent: *Mar. 3, 2009

(54) MEDIA PLAYER WITH ACCELERATION PROTECTION

(75) Inventors: Andrew Bert Hodge, Menlo Park, CA (US); Guy Bar-Nahum, San Francisco, CA (US); Jean-Paul Labrosse, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 757 days.

This patent is subject to a terminal disclaimer.

(21) Appl. No.: 10/463,700

(22) Filed: Jun. 16, 2003

(65) Prior Publication Data

US 2004/0252397 A1   Dec. 16, 2004

(51) Int. Cl.
*G11B 15/04* (2006.01)
*G11B 27/36* (2006.01)
*G11B 21/02* (2006.01)

(52) U.S. Cl. .............. 360/60; 360/31; 360/75

(58) Field of Classification Search .............. 369/30.23, 369/47.33, 47.38, 53.18, 53.35; 360/69, 360/75, 53

See application file for complete search history.

(56) References Cited

U.S. PATENT DOCUMENTS

| 4,692,915 | A |   | 9/1987  | Moriya et al. |  |
|-----------|---|---|---------|---------------|--|
| 4,939,611 | A |   | 7/1990  | Connolly |  |
| 5,295,026 | A | * | 3/1994  | Chishima ................. | 360/77.08 |
| 5,471,441 | A | * | 11/1995 | Nonaka et al. ........... | 369/30.11 |
| 5,982,573 | A |   | 11/1999 | Henze |  |
| 5,995,460 | A | * | 11/1999 | Takagi et al. ............. | 369/53.18 |
| 5,999,506 | A | * | 12/1999 | Shoji et al. ............... | 369/53.35 |
| 6,031,518 | A | * | 2/2000  | Adams et al. ............. | 345/156 |
| 6,332,175 | B1 | * | 12/2001 | Birrell et al. ............. | 369/30.23 |
| 6,453,266 | B1 | * | 9/2002  | Chainer et al. ............ | 340/506 |
| 6,768,066 | B2 |   | 7/2004  | Wehrenberg |  |
| 6,782,449 | B1 | * | 8/2004  | Codilian et al. .......... | 360/97.01 |

(Continued)

FOREIGN PATENT DOCUMENTS

JP   10-188452   7/1998

(Continued)

OTHER PUBLICATIONS

U.S. Appl. No. 10/997,479, filed Nov. 24, 2004.

(Continued)

*Primary Examiner*—Joseph H Feild
*Assistant Examiner*—Daniell L Negrón
(74) *Attorney, Agent, or Firm*—Beyer Law Group LLP (57) ABSTRACT

An improved media player and a method for operating a portable computing device (e.g., media player) are disclosed. According to one aspect, a portable computing device is able to protect its disk drive when being subjected to undesired levels of acceleration. The portable computing device protects its disk drive by monitoring for such accelerations and operating to avoid usage of the disk drive during periods of acceleration. Through such protection, the likelihood of damage to the disk drive or loss of data stored on the disk drive is able to be substantially reduced. According to another aspect, a user of a portable computing device can be alerted when the portable computing device is being subjected to undesirable levels of acceleration.

65 Claims, 6 Drawing Sheets

U.S. PATENT DOCUMENTS

| | | | |
|---|---|---|---|
| 6,785,195 B1* | 8/2004 | Kanazawa et al. | 369/24.01 |
| 2001/0026413 A1* | 10/2001 | Kisaka et al. | 360/60 |
| 2001/0053112 A1* | 12/2001 | Matsui | 369/47.3 |
| 2003/0012096 A1* | 1/2003 | Kitaoka et al. | 369/44.29 |

FOREIGN PATENT DOCUMENTS

| | | |
|---|---|---|
| JP | 2001-307413 | 11/2001 |
| JP | 2002-298496 | 10/2002 |

OTHER PUBLICATIONS

U.S. Appl. No. 10/791,495, filed Mar. 1, 2004.

Toshiba Shock Sensor Roadmap PPT Slide, Toshiba America Inc., p. 1, downloaded Apr. 29, 2003: http://www.toshiba.com/taec/components/Generic/PT_ShocksensorRoadMap.htm.

Toshiba MK2003GAH (HDD1364) Hard Disk Drive Specifications, Toshiba America Inc., 2003, pp. 1-3.

Toshiba MK6017MAP 6.0 GB IDE 2.5 9.5MM Notebook Hard Drive Specification, pp. 1-4, downloaded Apr. 29, 2003: http://shop.store.yahoo.com/netcomdirect/tosmk6017map.html.

HDK Acceleration Sensor, Hokuriku ACS010B specification, pp. 1-2.

MK2001MPL (HDD1212) Hard Disk Drive, Product Specification, Toshiba Storage Device Division, Toshiba Corporation, Sep. 2000.

Office Action (with English translation) dated Jun. 8, 2007 from corresponding Japanese Patent Application No. 200480016971X (14 pages).

Office Action dated Jan. 29, 2008 from European Application No. 04750246.3-1232.

Office Action dated Apr. 4, 2008 from Chinese Application No. 200480016971.X (2 pages).

* cited by examiner

MEDIA PLAYER WITH ACCELERATION PROTECTION

BACKGROUND OF THE INVENTION

1. Field of the Invention

The present invention relates to computing devices and, more particularly, to media players.

2. Description of the Related Art

Personal computers often include disk drives to provide mass storage of data. A disk drive (also known as a hard drive) has a disk that stores data magnetically and includes a read/write head to read or write data to the disk of the disk drive. The read/write head, when in use, scans over the disk at a very close distance. Normally, personal computers are stationary when being used and thus not subjected to significant vibrations. However, when personal computers are moved or otherwise not stationary, abrupt movements of the personal computers can result in significant vibrations. Such significant vibrations can cause the read/write head to undesirably make physical contact with the surface of the disk. Such undesirable physical contact can lead to loss of data and/or physical damage to the disk. When disk drives are not in use, the read/write head is placed in a park position such that the read/write head is not placed over the disk and thus cannot physically damage the disk or the data stored thereon.

In recent times, computing devices have become smaller and more compact. For example, there is a class of computing devices known as handheld computing devices. Handheld computing devices are sometimes more specialized computing devices than are general-purpose personal computers. For example, one type of handheld computing device is a portable (or personal) media player. Media players can also be referred to as consumer electronics products. A media player plays media, such as MP3 files, compact discs or DVDs, for the benefit of a user. The media player can utilize a disk drive to provide mass storage of media content that is played by the media player. The disk drive can remain in an "off" or "inactive" state such that the read/write head is often parked. However, when the disk drive is "on" or "active" and data is to be read from or written to the disk drive, the read/write head is susceptible of damaging the disk should vibrations occur during such read/write operations. Some disk drives advantageously include a shock sensor to detect shock levels, and when a substantial shock is detected, the read/write heads are stored over the center of the disk.

Conventionally, a cache memory is used to temporarily store media data that will soon be played. The cache memory offers rapid data access and reduces the need for constant access to the disk drive. Nevertheless, even with the use of a cache, a media player will periodically need to access the disk drive to refresh the cache contents with additional media data that is soon to be played by the media player. However, when such refresh is required, the presence of vibrations due to abrupt movements of the media player can lead to various problems. In particular, the vibrations can lead to physical damage of the disk drive as well as loss of data on the disk drive. Hence, there is a need to provide improved techniques to access data stored on a disk drive in the case of highly portable computing devices, such as media players, that are often used in conditions that may lead to vibrations.

SUMMARY OF THE INVENTION

Broadly speaking, the invention relates to a portable computing device and a method for operating a portable computing device. According to one aspect of the invention, a media player is able to protect its disk drive when being subjected to undesired levels of acceleration. Although the acceleration is undesired, the acceleration is often due to abrupt movement of the portable computing device. The portable computing device protects its disk drive by monitoring for such accelerations and operating to avoid usage of the disk drive during periods of acceleration. Through such protection, the likelihood of damage to the disk drive or loss of data stored on the disk drive is able to be substantially reduced. According to another aspect of the invention, a user of a portable computing device can be alerted when the portable computing device is being subjected to undesirable levels of acceleration. One type of portable computing device that the invention is particularly suitable for use with is a portable media player.

The invention can be implemented in numerous ways including, as a method, system, device, apparatus, or computer readable medium. Several embodiments of the invention are discussed below.

As a method for operating a portable media player having media stored on a disk drive, one embodiment of the invention includes at least the acts of: evaluating acceleration of the portable media player; determining whether the acceleration is substantial; and altering an operation of the portable media player when it is determined that the acceleration is substantial.

As a computer readable medium including at least computer program code for operating a portable media player having media stored on a disk drive, one embodiment of the invention includes at least: computer program code for evaluating acceleration of the portable media player; computer program code for determining whether the acceleration is substantial; and computer program code for altering an operation of the portable media player when it is determined that the acceleration is substantial.

As a portable media player, one embodiment of the invention includes at least: a storage disk drive that stores media content for each of a plurality of media items; an acceleration monitor that monitors acceleration of the portable media player; a cache that temporarily stores the media content for a subset of the plurality of media items stored on the storage disk drive; and a processor that controls the portable media player to play the media content from the cache, and to refresh the media content in the cache by storing the media content for another subset of the plurality of media items stored on the disk drive. The processor controls the portable media player to evaluate the acceleration of the portable media player, and the processor operates to restrict access to the media items stored on the storage disk drive when the portable media player is undergoing acceleration.

As a portable media player, one embodiment of the invention includes at least: a storage disk drive that stores media content for each of a plurality of media items; an acceleration monitor that monitors acceleration of the portable media player; a cache that temporarily stores the media content for a subset of the plurality of media items stored on the storage disk drive; and a processor that controls the portable media player to play the media content from the cache and to refresh the media content in the cache by storing the media content for another subset of the plurality of media items stored on the disk drive. The processor controls the portable media player to evaluate the acceleration of the portable media player, and the processor operates to produce a user feedback when the portable media player is undergoing acceleration.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to a portable computing device and a method for operating a portable computing device. One type of portable computing device that the invention is particularly suitable for use with is a portable media player.

According to one aspect of the invention, a portable computing device is able to protect its disk drive when being subjected to undesired levels of acceleration. Although the acceleration is undesired, the acceleration is often due to abrupt movement of the portable computing device. The portable computing device protects its disk drive by monitoring for such accelerations and operating to avoid usage of the disk drive during periods of acceleration. Through such protection, the likelihood of damage to the disk drive or loss of data stored on the disk drive is able to be substantially reduced. Even in the case that a disk drive has a shock sensor to protect its read/write head, the protection provided by the invention can provide earlier awareness and/or responsiveness to acceleration than might be provided by the shock sensor within the disk drive.

The portable computing device (e.g., media player) can, for example, be subjected to undesired levels of acceleration when its user carries the device and abruptly moves the device. For example, abrupt movement can result from the user carrying the device while running, jogging, standing-up, sitting-down, or by the user banging, dropping or throwing the device.

According to another aspect of the invention, a user of a portable computing device can be alerted when the media player is being subjected to undesirable levels of acceleration. In other words, the user of the portable computing device is provided with feedback that alerts the user to the existence of undesirable levels of acceleration. As a consequence, the alert signifies that additional data (media) is not available to be retrieved from the disk drive and played. The feedback can be based on one or more of audio, visual, mechanical, sensory and the like. The feedback can alert the user to take corrective action to reduce accelerations imposed on the media player if they want to have additional data (media) played. For example, the feedback can encourage the user to reduce any accelerations that may be user-induced.

Embodiments of this aspect of the invention are discussed below with reference to FIGS. 1A-5. However, those skilled in the art will readily appreciate that the detailed description given herein with respect to these figures is for explanatory purposes as the invention extends beyond these limited embodiments.

Figure 1A:
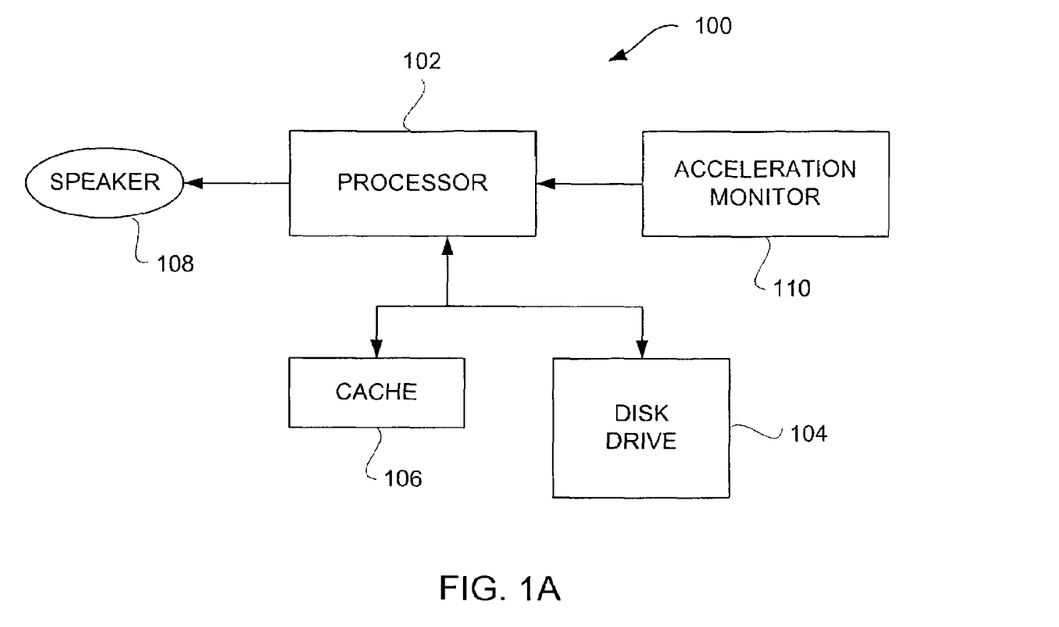
FIG. 1A is a block diagram of a portable computing device according to one embodiment of the invention.

FIG. 1A is a block diagram of a portable computing device 100 according to one embodiment of the invention. The portable computing device 100 includes a processor 102 that couples to a disk drive 104 and a cache 106. The disk drive 104 stores data that is utilized by the portable computing device 100. The cache 106 provides a smaller amount of data storage that is able to be rapidly and efficiently retrieved as compared to the disk drive 104. Typically, the disk drive 104 would provide non-volatile storage and the cache 106 would provide volatile storage. Often, the cache 106 is semiconductor memory, such as Random-Access Memory (RAM). The portable computing device 100 also includes a speaker 108 for outputting audio sounds, such as to a user. The processor 102 could produce an audio output for the speaker 108 or additional circuitry (not shown) between the processor 102 and the speaker 108 can produce the audio output. As an example, the additional circuitry can be a coder/decoder (CODEC).

In addition, the portable computing device 100 includes an acceleration monitor 110. The acceleration monitor 110 can be implemented in a variety of different ways. For example, the acceleration monitor 110 can monitor vibration in one embodiment of the invention.

The acceleration monitor 110 can monitor acceleration of the portable computing device 100 and yield acceleration information. The acceleration information provided by the acceleration monitor 110 can be utilized by the processor 102 in determining appropriate times to access the data stored on the disk drive 104. In general, access to the disk drive 104 is managed based on the acceleration information. For example, when the acceleration information indicates presence of substantial acceleration, access to the disk drive 104 can be substantially prevented. As another example, access to the disk drive 104 can be deferred until substantial acceleration subsides. Additionally or alternatively, the acceleration information provided by the acceleration monitor 110 can be utilized by the processor 102 in determining whether and how to alter or inform its user of the presence of substantial acceleration. Once altered or advised, the user can intercede to reduce the acceleration of the portable computing device 100. For example, the user can steady or cease movement of the portable computing device 100 so that substantial accelerations subside and access to the disk drive 104 can safely be performed.

Figure 1B:
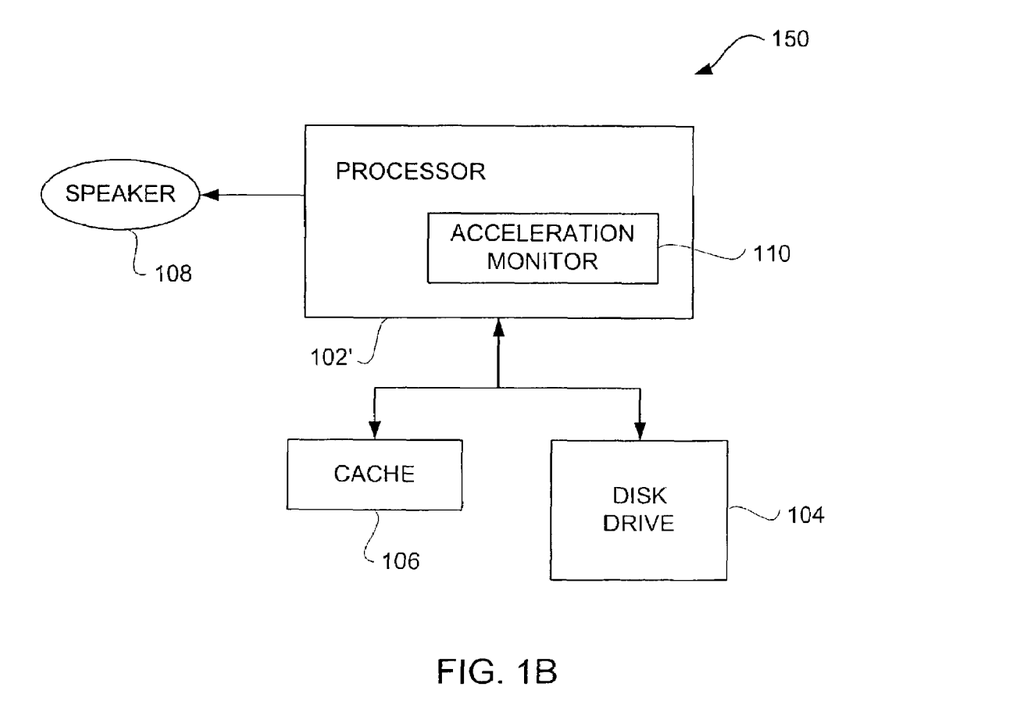
FIG. 1B is a block diagram of a portable computing device according to another embodiment of the invention.

FIG. 1B is a block diagram of a portable computing device 150 according to another embodiment of the invention. The components of the portable computing device 150 are similar to the components of the portable computing device 100 shown in FIG. 1A. However, the portable computing device 150 provides the acceleration monitor 110 within the processor 102'. In this regard, the acceleration monitor 110 can be considered to be implemented by hardware, software, or both. In one example, the acceleration monitor 110 is implemented in software that is executed by the processor 102' in order to monitor vibration of the portable computing device 150.

Regardless of where and how the acceleration monitor 110 is implemented, the acceleration monitor 110 serves to monitor the acceleration (e.g., vibration) of the associated portable computing device 100, 150. When substantial levels of acceleration have been detected, estimated or predicted, the associated portable computing device 100, 150 can respond in appropriate ways. For example, the presence of substantial acceleration could cause any access to the disk drive 104 to be ceased or deferred while the substantial acceleration is present. As another example, the presence of substantial acceleration can alert the user of the portable computing device 100, 150 that excessive acceleration is present and thus suggest corrective action on behalf of the user. In still another example, when substantial acceleration is present and the disk drive access is ceased or delayed due to the acceleration, then alternative data can be retrieved from the cache 106 and utilized in place of the originally requested data present on the disk drive 104.

The portable computing devices 100, 150 are typically small computing devices that are highly mobile, such as handheld devices. Specifically, in one embodiment, the portable computing devices are portable media players. Examples of portable media players include MP3 players, compact disk players, and DVD players. These devices include disk drives that read data (media content) from a disk. With substantial acceleration, the reading of data from such disk drives can fail and/or damage the disk drive. Hence, the ability to sense the significant accelerations and take an appropriate response can overcome the problems of destruction of stored data and/or physical damage to disk drive. Further, the presence of substantial accelerations can also lead to disk thrashing (i.e., repeated unsuccessful attempts to read data from disk), which wastes power and can lead to excessive wear of the disk.

Figure 2A:
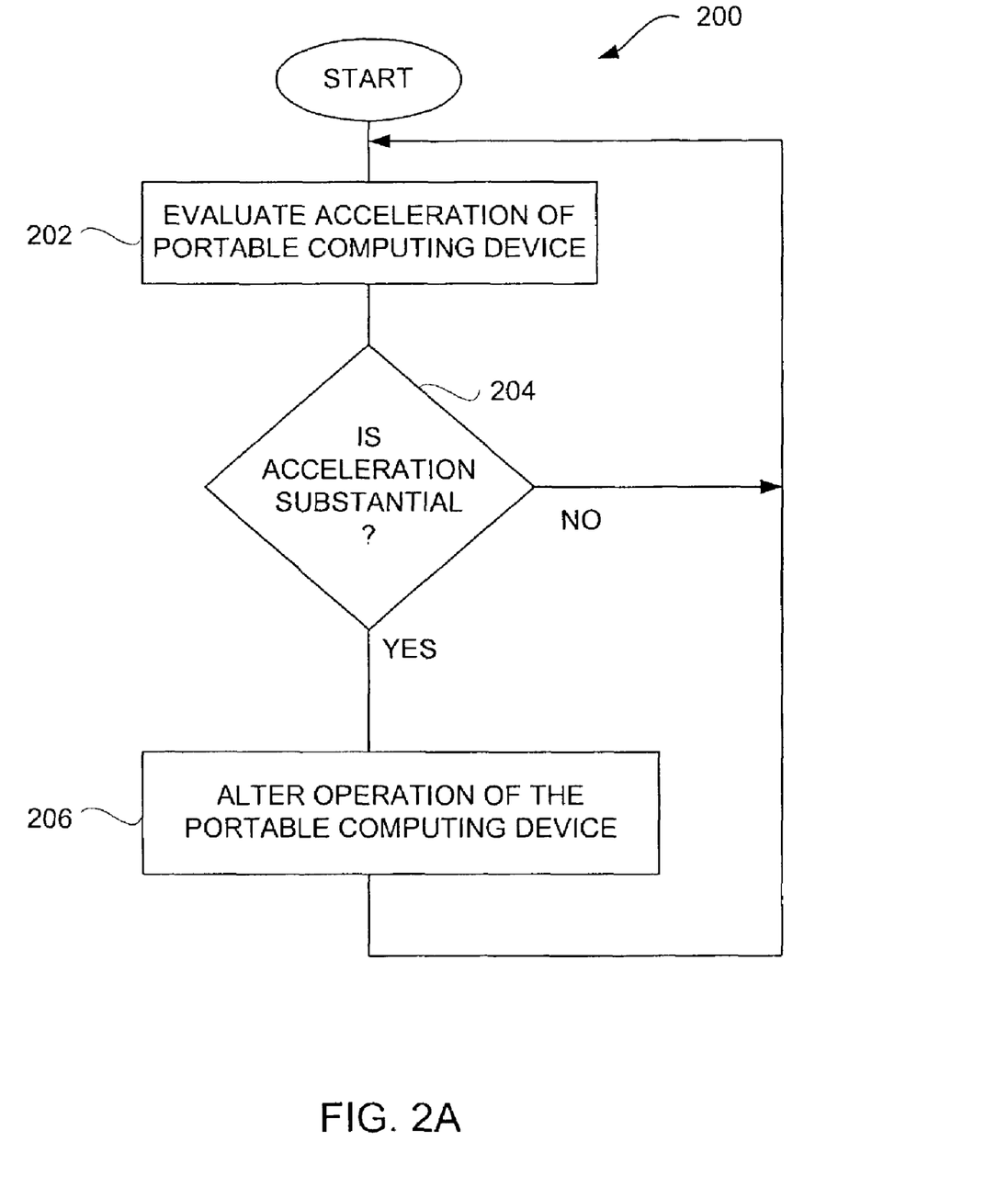
FIG. 2A is a flow diagram of acceleration management processing according to one embodiment of the invention.

FIG. 2A is a flow diagram of acceleration management processing 200 according to one embodiment of the invention. The acceleration management processing 200 is performed by a portable computing device, such as the portable computing devices 100 and 150 shown in FIGS. 1A and 1B.

The acceleration management processing 200 evaluates 202 acceleration of the portable computing device. Next, a decision 204 determines whether the acceleration of the portable computing device is substantial. In one embodiment, the acceleration that is being evaluated 202 is represented by an acceleration indication (e.g., vibration) and the determination of whether the acceleration is substantial can be performed by comparing the acceleration indication with a threshold value. In any case, when the decision 204 determines that the acceleration is not substantial, and the acceleration management processing 200 can return to re-evaluate the acceleration of the portable computing device at an appropriate time. On the other hand, when the decision 204 determines that the acceleration of the portable computing device is substantial, then operation of the portable computing device is altered 206. The alteration of the operation of the portable computing device can be implemented in a variety of different ways. For example, the alteration of the operation might stop, delay or defer access to a disk drive of the portable computing device. As another example, the operation being altered might provide feedback to the user that excessive vibration is present. Still another operation that can be altered might include artificially producing the skipping sound and presenting such to the user. Yet another example of an operation that might be altered is using alternative content that is available from a cache memory (e.g., the cache 106). In any event, following the operation 206, the acceleration management processing 200 returns to repeat the operation 202 and subsequent operations. It should be noted that the acceleration management processing 200 can be performed periodically or event driven. It should also be noted that the alteration of the operations can last for a predetermined time period or can be reset when the excessive acceleration has ceased.

Figure 2B:
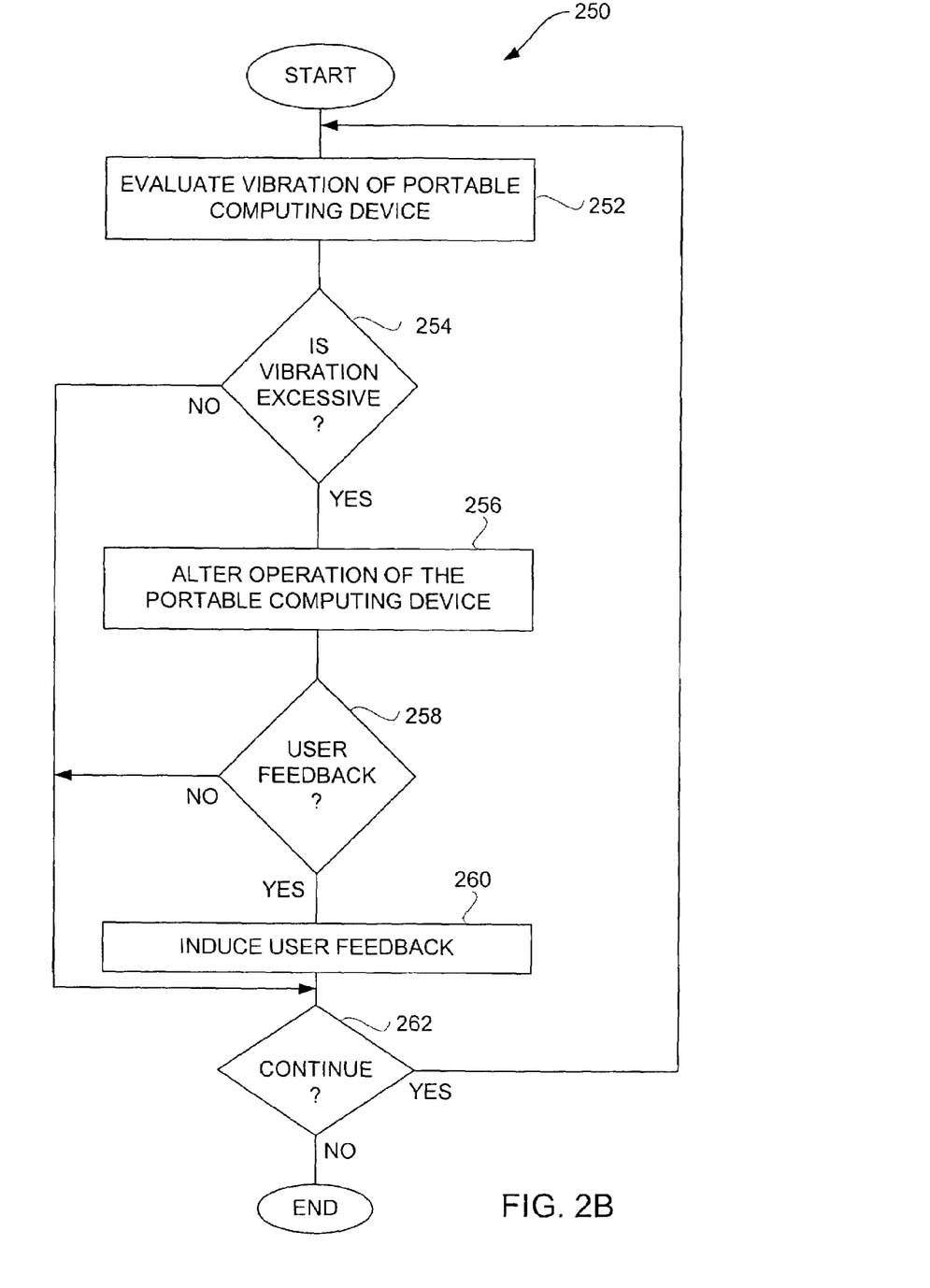
FIG. 2B is a flow diagram of vibration management processing according to one embodiment of the invention.

FIG. 2B is a flow diagram of vibration management processing 250 according to one embodiment of the invention. The vibration management processing 250 is, for example, performed by a portable computing device, such as the portable computing devices 100, 150 shown in FIGS. 1A and 1B.

The vibration management processing 250 evaluates 252 vibration of the portable computing device. Next, a decision 254 determines whether the vibration of the portable computing device is excessive. In one embodiment, the vibration that is being evaluated 252 is represented by a vibration indication and the determination of whether the vibration is excessive can be performed by comparing the vibration indication with a threshold value. In any case, when the decision 254 determines that the vibration is not excessive, the vibration management processing 250 can return to re-evaluate the vibration of the portable computing device at an appropriate time. On the other hand, when the decision 254 determines that the acceleration of the portable computing device is excessive, then operation of the portable computing device is altered 256. The alteration of the operation of the portable computing device can be implemented in a variety of different ways, including those mentioned above with respect to FIG. 2A.

It should be noted that the vibration management processing 250 performs the operations 252-256 to evaluate vibration of the portable computing device and then alters an operation of the portable computing device when excessive vibration is determined to be present. These operations 252-256 are similar to the operations 202-206 of the acceleration management processing 200 of FIG. 2A, with the primary distinction being that FIG. 2B pertains to vibration, which is a class or type of acceleration.

Additionally, in the case of excessive vibration, i.e., following the operation 256, the vibration management processing 250 additionally determines at decision 258 whether user feedback is to be provided. When the decision 258 determines that user feedback is to be provided, then user feedback is induced 260. The user feedback can vary with implementation. For example, the user feedback can be an artificial skipping sound, an audio message, an audio tone or beep, a tactile response, a visual alert, etc. When the decision 258 determines that user feedback is not to be provided, then the operation 260 is bypassed. In any case, following the operation 260, following the decision 254 when excessive vibration is not present, or following the decision 260 when user feedback is not needed, a decision 262 determines whether the vibration management processing 250 should continue. The decision 262 can, for example, control the rate at which the vibration is re-evaluated. In any case, when the decision 262 determines that the vibration management processing 250 should continue, then the processing returns to repeat the operation 252 and subsequent operations. On the other hand, when the decision 262 determines that the vibration management processing 250 should not continue (e.g., should stop), the vibration management processing 250 is complete and ends.

It should be noted that the vibration management processing 250 can be performed on a periodic or event driven basis. It should also be noted that the alteration of the operations can last for a predetermined time period or can be reset after the excessive vibration has ceased.

Figure 3:
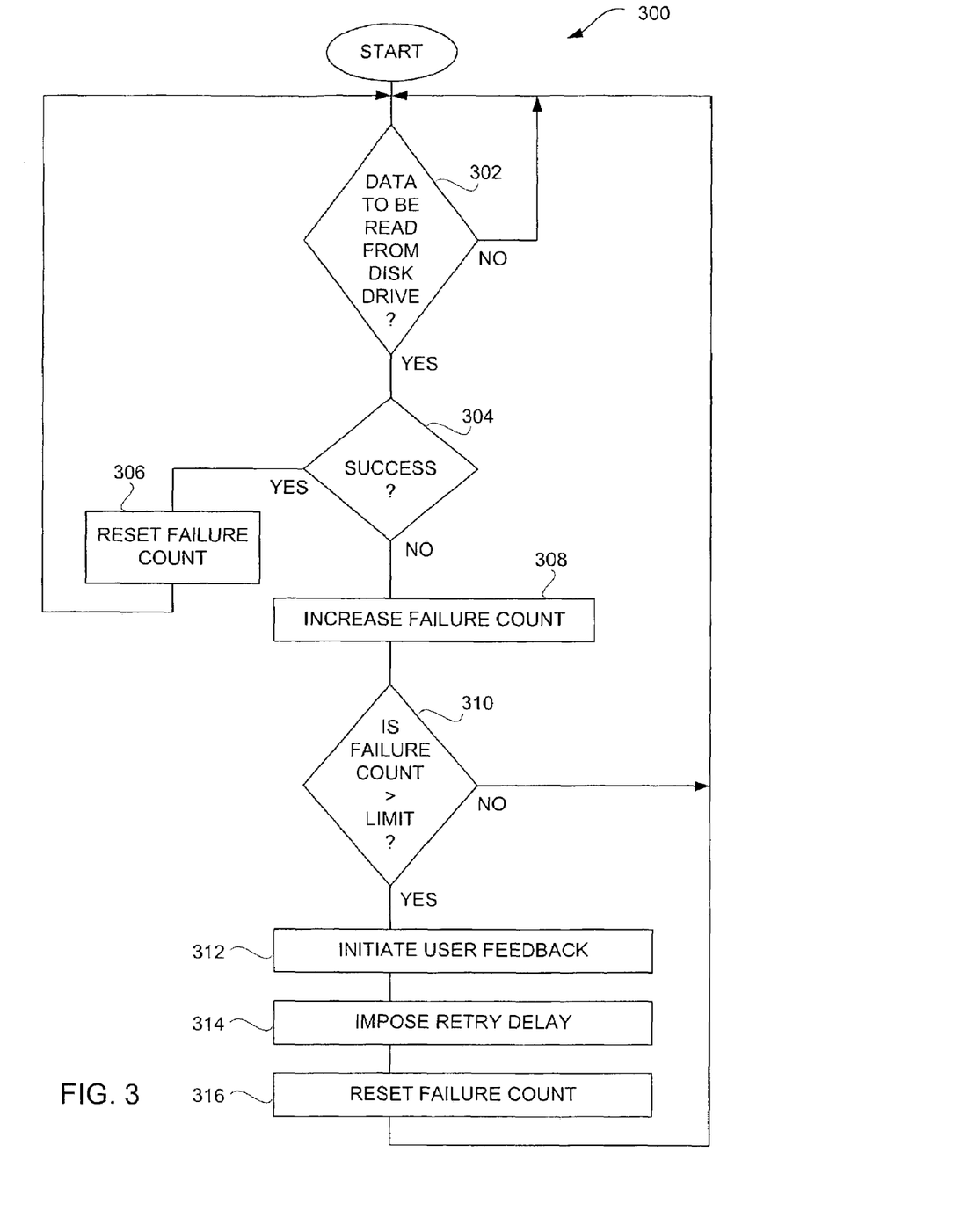
FIG. 3 is a flow diagram of disk drive control processing according to one embodiment of the invention.

FIG. 3 is a flow diagram of disk drive control processing 300 according to one embodiment of the invention. The disk drive control processing 300 influences when requested data is read from a disk drive of a portable computing device.

The disk drive control processing 300 begins with a decision 302 that determines whether data is to be read from the disk drive. When the decision 302 determines that data is not to be read from the disk drive at this time, then the disk drive control processing 300 awaits the need for data. Once the decision 302 determines that data is to be read from the disk drive, then a decision 304 determines whether the data has been successfully read from the disk drive. When the decision 304 determines that the data has been successfully read, then a failure count is reset 306. Following the operation 306, the disk drive control processing 300 returns to repeat the decision 302 and subsequent operations so that additional data can be read from the disk drive.

On the other hand, when the decision 304 determines that the data was not successfully read from the disk drive, then a failure count is increased 308. Next, a decision 310 determines whether the failure count is greater than a threshold limit. When the decision 310 determines that the failure count is not greater than a threshold limit, then the disk drive control processing 300 returns to repeat the decision 302 and subsequent operations so that another attempt to read the data can be made.

Alternatively, when the decision 310 determines that the failure count does exceed the threshold limit, then user feedback is initiated 312. As previously noted, the user feedback can be audio, visual, tactile or other sensory indication or response that is provided to the user of the portable computing device. Typically, the user feedback will signify to the user that the disk drive is having difficulty reading data. Often, the difficulty in reading the data from the disk drive will have been caused by excessive acceleration (e.g., vibration) of the portable computing device, and thus the disk drive internal thereto. Hence, the user feedback can explicitly or implicitly inform the user that the excessive accelerations are causing difficulty and that they can take responsive action to reduce or eliminate the excessive accelerations. Next, a retry delay can be imposed 314. For example, when excessive accelerations are present, the disk drive would normally continuously attempt to read data, but the successive accelerations can lead to damage of the disk and thrashing attempts or inefficient use of battery power. Hence, the imposition of the retry delay can eliminate these concerns for at least the duration of the retry delay. Following the imposition 314 of the retry delay (and waiting for its delay period), the failure count can be reset 316. Following the operation 316, the disk drive control processing 300 returns to repeat the decision 302 and subsequent operations.

Figure 4:
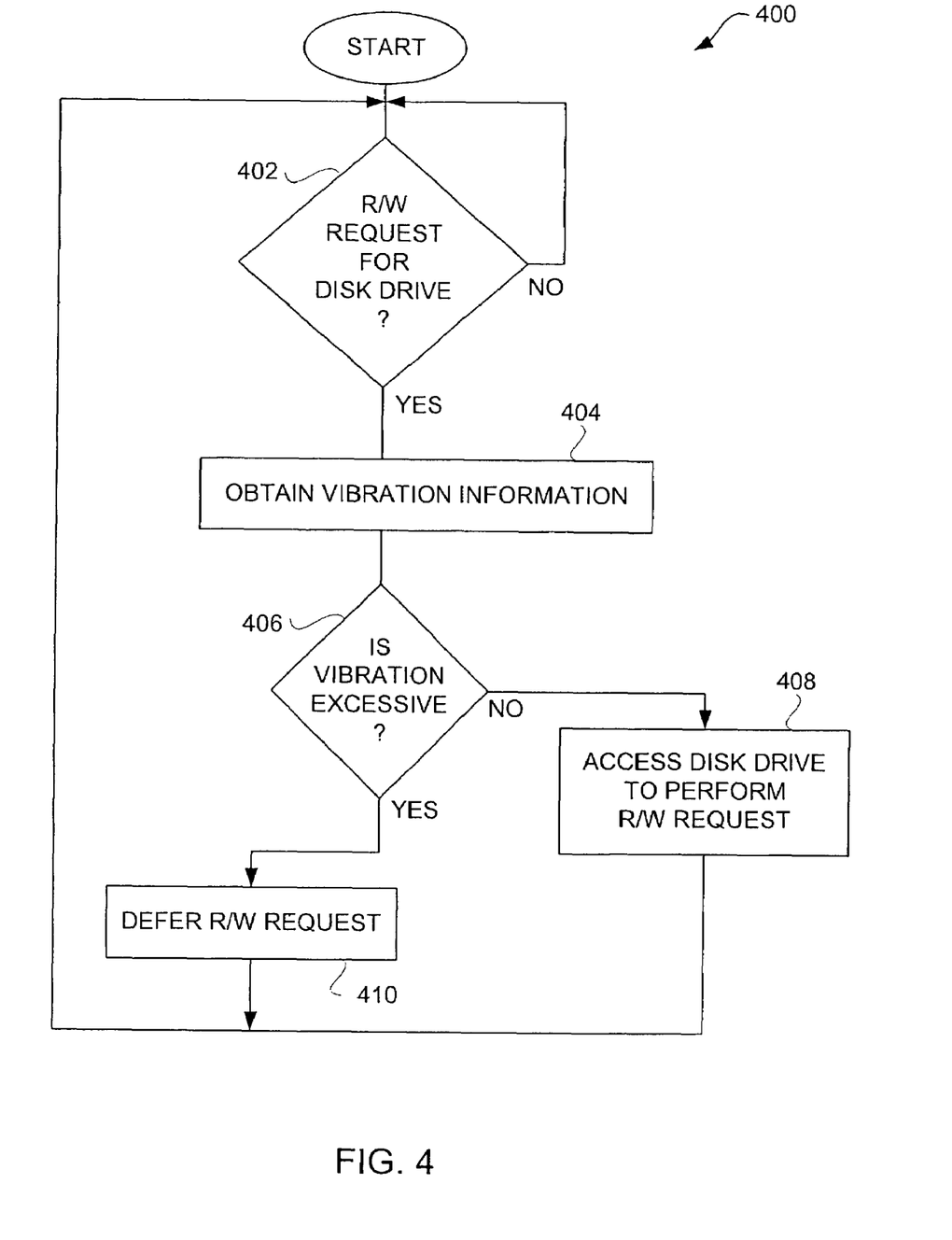
FIG. 4 is a flow diagram of disk drive control processing according to another embodiment of the invention.

FIG. 4 is a flow diagram of disk drive control processing 400 according to another embodiment of the invention. The disk drive control processing 400 is processing performed by a portable computing device having a disk drive.

The disk drive control processing 400 begins with a decision 402 that determines whether a read or write (R/W) request to the disk drive is present. When the decision 402 determines that there is no read or write request at this time, then the disk drive control processing 400 awaits such a request. Alternatively, when the decision 402 determines that a read or write request to the disk drive is present, then vibration information is obtained 404. The vibration information can be obtained through a heuristic evaluation of the operation of the disk drive or through a vibration sensor (e.g., accelerometer) coupled to the disk drive. In any case, after the vibration information has been obtained 404, a decision 406 determines whether the vibration present is excessive. In one embodiment, the vibration can be determined to be excessive when the vibration information indicates that the vibration of the portable computing device exceeds a threshold level.

In any case, when the decision 406 determines that the vibration is not excessive, then the disk drive is accessed 408 to perform the read or write request. On the other hand, when the decision 406 determines that the vibration present at the portable computing device is excessive, then the read or write request is deferred 410. Typically, the read or write request would be deferred 410 for a period of time. The period of time can be static or dynamic. The period of time can be based on current vibration information or a history of vibration information.

Following the operations 408 and 410, the disk drive control processing 400 returns to repeat the decision 402 and subsequent operations. Hence, according to the disk drive control processing 400, a read or write request to a disk drive is deferred when excessive vibrations are present. As a result, the power that would otherwise have been wasted in attempting to access the disk drive is conserved and potential damage to the disk drive or the data thereon is minimized.

Figure 5:
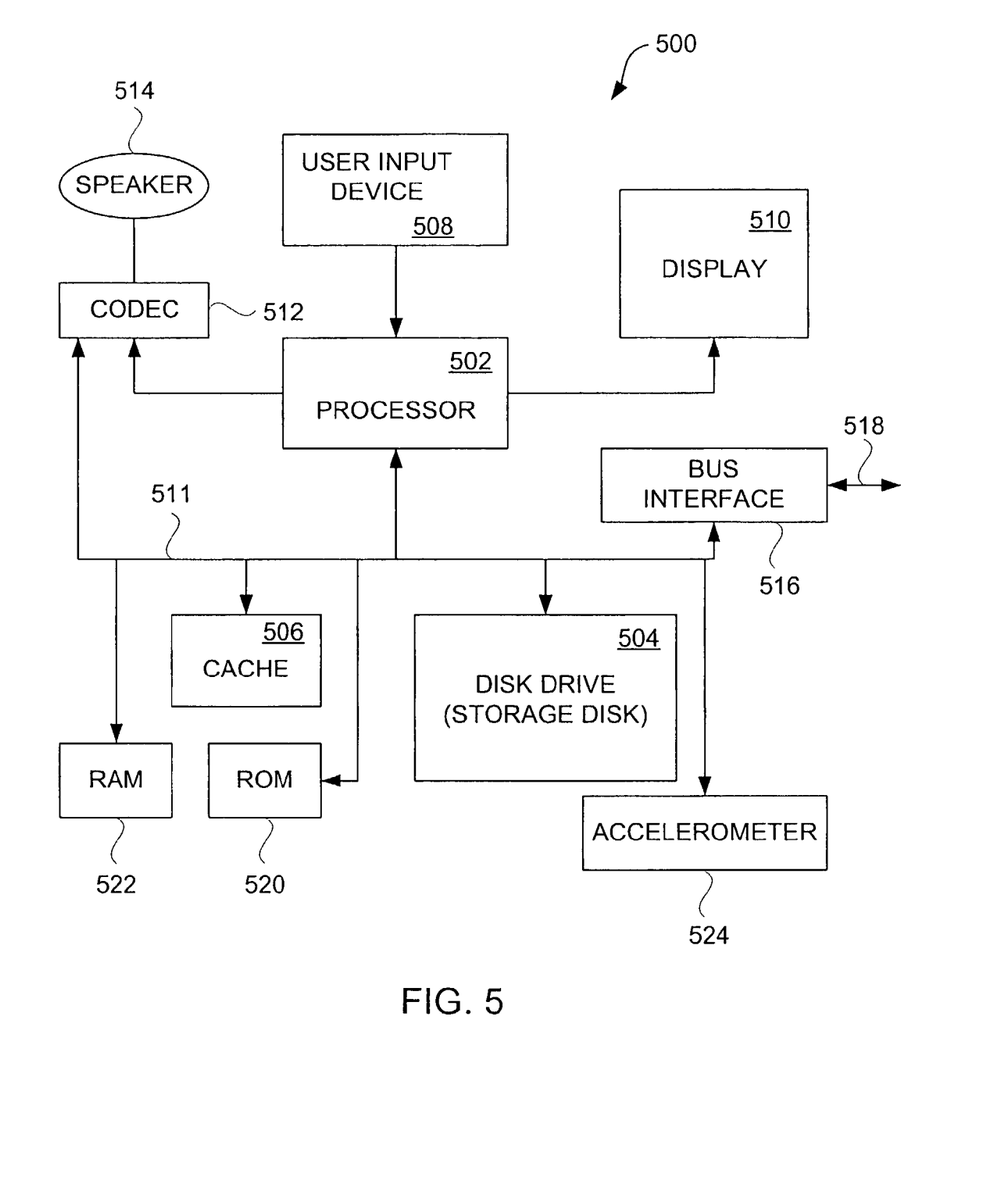
FIG. 5 is a block diagram of a media player according to one embodiment of the invention.

FIG. 5 is a block diagram of a media player 500 according to one embodiment of the invention. The media player 500 includes a processor 502 that pertains to a microprocessor or controller for controlling the overall operation of the media player 500. The media player 500 stores media data pertaining to media items in a file system 504 and a cache 506. The file system 504 is typically a disk drive or a plurality of disk drives. The file system 504 typically provides high-capacity storage capability for the media player 500. However, since the access time to the file system 504 is relatively slow, the media player 500 also includes a cache 506. The cache 506 is, for example, Random-Access Memory (RAM) provided by semiconductor memory. The relative access time to the cache 506 is substantially shorter than for the file system 504 (disk drive). However, the cache 506 does not have the large storage capacity of the file system 504.

Power consumption is particularly important when the media player 500 is a portable media player that is powered by a battery (not shown). The file system 504, when active, consumes more power than does the cache 506. In one embodiment, once the media data for the particular media item has been loaded into the cache 506, the file system 504 can be inactivated (e.g., placed in a low power mode) to save power consumption for the media player 500. By deactivating the file system 504 in this matter, battery life of the media player 500 is able to be significantly increased, assuming that the media player 500 is a battery-operated device (portable device). Intelligent usage of the file system 504 and the cache 506 can not only conserve power but also provide more user-responsiveness. Additional details pertaining to intelligent use of the file system 504 and the cache 560 are provided in U.S. patent application Ser. No. 10/118,217, filed Apr. 5, 2002, which is hereby incorporated herein by reference.

The media player 500 also includes a user input device 508 that allows a user of the media player 500 to interact with the media player 500. For example, the user input device 508 can take a variety of forms, such as a button, keypad, dial, etc. Still further, the media player 500 includes a display 510 (screen display) that can be controlled by the processor 502 to display information to the user. A data bus 511 can facilitate data transfer between at least the file system 504, the cache 506, the processor 502, and the CODEC 512.

In one embodiment, the media player 500 serves to store a plurality of media items (e.g., songs) in the file system 504. When a user desires to have the media player play a particular media item, a list of available media items is displayed on the display 510. Then, using the user input device 508, a user can select one of the available media items. The processor 502, upon receiving a selection of a particular media item, supplies the media data (e.g., audio file) for the particular media item to a coder/decoder (CODEC) 512. The CODEC 512 then produces analog output signals for a speaker 514. The speaker 514 can be a speaker internal to the media player 500 or external to the media player 500. For example, headphones or earphones that connect to the media player 500 would be considered an external speaker.

According to the invention, the processor 502 controls the playing of the particular media item such that upon receiving the user's selection of the particular media item, the processor 502 then immediately accesses the file system 504 or the cache 506 to retrieve an initial portion of the media data and supplies it to the CODEC 512 and thus begins playing the media item. When the media item is not initially available in the cache 506 (which is typically the case), the initial portion is retrieved from the file system 504. However, since the access speed of the file system 504 is relatively slow compared to the access speed needed for the playing of the media item, and because the file system 504 consumes significant amounts of power of the media player 500, the media data for the media item is loaded into the cache 506 such that once the media data has been loaded into the cache 506, all remaining portions of the media data for the particular media item are retrieved from the cache 506. Consequently, the media item is played substantially immediately following the user's selection because the initial portion is obtained immediately from the file system 504 and then subsequent portions are obtained from the cache 506. Here, the cache 506 is loaded at the same time that the retrieval or playing of the initial portion of the media data occurs.

However, the size of the media item is usually larger than the size of the cache 506. As a result, the cache 506 must be periodically refreshed with a next remaining portion of the media data. To refresh the cache 506 with a next remaining portion, the processor 502 needs to access the file system 504 (disk drive) to retrieve the next remaining portion and then cause such next remaining portion to be stored in the cache 506. The refresh process occurs periodically and must be promptly achieved in order to not introduce "dead air" or "quiet periods" when the media player 500 is playing the media item.

The media player 500 further includes an accelerometer 524. The accelerometer 524 can provide an indication of acceleration induced on the media player 500. The acceleration can also be considered to be one form of vibration. In any case, the acceleration is supplied to the processor 502 and/or a disk controller (not shown) for the file system 504 so that access to the disk drive is performed in a safe and power-efficient manner. As noted above, when acceleration (e.g., vibration) is present at the media player 500, access to the file system 504 (disk drive) is problematic. As a consequence, the refresh process can be unsuccessful or slow during the presence of significant acceleration. Consequently, the sound output at the speaker 514 can undesirably contain "dead air" or "quiet periods." The processor 502 can make use of the indication of acceleration induced on the media player 500 to determine whether access to the file system 504 should be attempted. In this regard, access to the file system 504 can be performed only when safe and not likely to fail because of excessive acceleration. Hence, the media player 500 operates to access the file system 504 in a safe and power efficient way. Still further, the processor 502 could also take preemptive actions to process refresh operations more frequently so that imposed delay due to vibrations does not cause "dead air" or "quiet periods" in the audio output.

In one embodiment, the media player is a portable computing device dedicated to processing media such as audio, video or images. For example, the media player 500 can be a music player (e.g., MP3 player), a game player, a video player, a video recorder, a camera, an image viewer and the like. These devices are generally battery operated and highly portable so as to allow a user to listen to music, play games or video, record video or take pictures wherever the user travels. In one implementation, the media player is a handheld device that is sized for placement into a pocket or hand of the user. By being handheld, the media player is relatively small and easily handled and utilized by its user. By being pocket sized, the user does not have to directly carry the device and therefore the device can be taken almost anywhere the user travels (e.g., the user is not limited by carrying a large, bulky and often heavy device, as in a portable computer). Furthermore, the device may be operated by the user's hands, no reference surface such as a desktop is needed.

The detection of substantial acceleration and/or the alteration to an operation of a media player can be dependent on past or expected usage behaviors (of its particular user or users in general). If feedback is provided, the feedback can seek to alter user behavior. The feedback can also be dependent on past or expected usage behaviors.

In certain embodiments of the invention described above, operation alteration as well as user feedback where provided and dependent on acceleration. Nevertheless, if should be understood that operations alteration and user feedback are separate features which can be independently provided. The operations alteration and the user feedback can also be invoked on same or different conditions, thresholds, etc.

The various aspects, features, embodiments or implementations of the invention described above can be used alone or in various combinations.

As noted above, the invention generally pertains to portable computing devices. One type of portable computing device that the invention is particularly suitable for use with is a portable (or personal) media player. Media players can also be referred to as consumer electronics products or handheld computing devices.

Although the media items of emphasis in several of the above embodiments were audio items (e.g., audio files or songs, such as for music), the media items are not limited to audio items. For example, the media item can alternatively pertain to videos (e.g., movies) or images (e.g., photos).

The invention is preferably implemented by hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different embodiments or implementations may yield one or more of the following advantages. One advantage of the invention is that loss of data and/or damage to a disk drive can be substantially prevented. Another advantage of the invention is that media items can be played by a media device with significantly less likelihood that "dead air" or "quiet periods" are undesirably introduced, even though the media player undergoes accelerations while playing media items. Consequently, audio playback quality is improved and users are more satisfied. Another advantage of the invention is that power consumption is reduced through intelligent monitoring of acceleration (e.g., vibration) of a disk drive.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for operating a portable media player having media stored on a disk drive, said method comprising:
   (a) evaluating acceleration of the portable media player by utilizing at least a failure count, wherein the failure count represents a number of consecutive failed read operations since a previously successful read operation from the disk drive;
   (b) determining whether the acceleration is substantial based at least on whether the failure count exceeds a threshold level; and
   (c) altering an operation of the portable media player when said determining (b) determines that the acceleration is substantial, wherein the acceleration is substantial when at least the failure count exceeds the threshold level.

2. A method as recited in claim 1, wherein the acceleration of the portable media player pertains to vibration of the portable media player.

3. A method as recited in claim 1, wherein the portable media player further includes an acceleration monitor, and wherein said evaluating (a) of the acceleration is based on information provided by the acceleration monitor.

4. A method as recited in claim 1, wherein the operation is a read/write operation from the disk drive, and wherein said altering (c) of the operation operates to defer the read/write operation.

5. A method as recited in claim 4, wherein the read/write operation is defened until after the accelerations substantially cease.

6. A method as recited in claim 1, wherein the operation is a read/write operation from the disk drive, and wherein said altering (c) of the operation operates to stop or prevent the read/write operation.

7. A method as recited in claim 1, wherein the operation is a read/write operation from the disk drive, and wherein said altering (c) of the operation operates to slow a rate at which the read/write operation is retried.

8. A method as recited in claim 1, wherein said method further comprises:
   (d) initiating user feedback when said determining (b) determines that the acceleration is substantial.

9. A method as recited in claim 8, wherein the user feedback is at least one of auditory, tactile, and visual.

10. A method as recited in claim 8, wherein the user feedback alerts the user that the portable media player is undergoing substantial accelerations.

11. A method as recited in claim 8, wherein the user feedback is a predetermined audible message.

12. A method as recited in claim 8, wherein the user feedback is an artificial skip sound that is presented to the user.

13. A method as recited in claim 1, wherein the operation is unrelated to the disk drive.

14. A method as recited in claim 1, wherein said altering (c) of the operation is dependent on past or expected usage behaviors.

15. A computer readable medium encoded with computer program code for operating a portable media player having media stored on a disk drive, said computer readable medium comprising:
   computer program code for evaluating acceleration of the portable media player by utilizing at least a failure count, wherein the failure count represents a number of consecutive failed read operations since a previously successful read operation from the disk drive;
   computer program code for determining whether the acceleration is substantial based at least on whether the failure count exceeds a threshold level; and
   computer program code for altering an operation of the portable media player when it is determined that the acceleration is substantial wherein the acceleration is substantial when at least the failure count exceeds the threshold level.

16. A computer readable medium as recited in claim 15, wherein the acceleration of the portable media player pertains to vibration of the portable media player.

17. A computer readable medium as recited in claim 15, wherein the portable media player further includes an acceleration monitor, and
   wherein said computer program code for evaluating evaluates the acceleration based on information provided by the acceleration monitor.

18. A computer readable medium as recited in claim 15 wherein the operation is a read/write operation from the disk drive, and wherein said computer program code for altering the operation operates to defer the read/write operation until after the accelerations substantially cease.

19. A computer readable medium as recited in claim 15, wherein the operation is a read/write operation from the disk drive, and
   wherein said computer program code for altering the operation operates to slow a rate at which the read/write operation is retried.

20. A computer readable medium as recited in claim 15, wherein said computer readable medium further comprises:
   computer program code for initiating user feedback when said computer program code for determining determines that the acceleration is substantial.

21. A portable media player, comprising:
   a storage disk drive that stores media content for each of a plurality of media items;
   an acceleration monitor that monitors acceleration of said portable media player;
   a cache that temporarily stores the media content for a subset of the plurality of media items stored on said storage disk drive; and
   a processor operatively connected to said storage disk drive, said acceleration monitor and said cache, said processor controls said portable media player to play the media content from said cache and to refresh the media content in said cache by storing the media content for another subset of the plurality of media items stored on said disk drive,
   wherein said processor controls said portable media player to evaluate the acceleration of said portable media player by utilizing at least a failure count, wherein the failure count represents a number of consecutive failed read operations since a previously successful read operation from the storage disk drive and wherein said processor operates to restrict access to the media items stored on said storage disk drive when said portable media player is undergoing substantial acceleration wherein the acceleration is substantial when at least the failure count exceeds a threshold level.

22. A portable media player as recited in claim 21, wherein said portable media player is battery-operated.

23. A portable media player as recited in claim 22, wherein said portable media player is pocket-sized that fits into a garment pocket.

24. A portable media player as recited in claim 21, wherein said storage disk drive provides magnetic data storage.

25. A portable media player as recited in claim 21, further comprising:
a display device that is a liquid crystal display with a light-emitting diode backlight.

26. A portable media player as recited in claim 21, wherein said portable media player comprises an audio player, and wherein the media content for the media items includes at least audio files of songs.

27. A portable media player as recited in claim 21, wherein said portable media player comprises a video player, and wherein the media content for the media items includes at least video files of videos.

28. A portable media player as recited in claim 21, wherein said portable media player comprises an image viewer, and wherein the media content for the media items includes at least image files of images.

29. A portable media player as recited in claim 21, wherein said portable media player further comprises:
a user input device that enables a user of said portable media player to at least select a particular media item from the plurality of media items through a rotational action with respect to said user input device.

30. A portable media player as recited in claim 29, wherein said processor controls said portable media player to load said cache from said storage disk drive with at least a portion of the media content of the particular media item that was selected using said user input device.

31. A portable media player as recited in claim 29, wherein said user input device comprises a rotary dial or a touchpad.

32. A portable media player, comprising:
a storage disk drive that stores media content for each of a plurality of media items;
an acceleration monitor that monitors acceleration of said portable media player;
a cache that temporarily stores the media content for a subset of the plurality of media items stored on said storage disk drive; and
a processor operatively connected to said storage disk drive, said acceleration monitor and said cache, said processor controls said portable media player to play the media content from said cache and to refresh the media content in said cache by storing the media content for another subset of the plurality of media items stored on said disk drive,
wherein said processor controls said portable media player to evaluate the acceleration of said portable media player by utilizing at least a failure count, wherein the failure count represents a number of consecutive failed read operations since a previously successful read operation from the storage disk drive and
wherein said processor operates to produce a user feedback when said portable media player is undergoing substantial acceleration, wherein the acceleration is substantial when at least the failure count exceeds a threshold level.

33. A portable media player as recited in claim 32, wherein the user feedback is one or more of audio, visual, mechanical, and user sensory.

34. A method as recited in claim 1, wherein the operation is a read operation from the disk drive, and wherein said altering (c) of the operation operates to read alternative data from a cache.

35. A method as recited in claim 8, wherein the user feedback is a tactile response.

36. A method as recited in claim 8, wherein the user feedback is a visual alert.

37. A method for operating a portable media player having media stored on a disk drive, said method comprising:
(a) evaluating acceleration of the portable media player by utilizing at least a failure count, wherein the failure count represents a number of consecutive failed read operations from the disk drive;
(b) determining whether the acceleration is substantial based at least on whether the failure count exceeds a threshold level, wherein the acceleration is substantial when the failure count exceeds the threshold level;
(c) altering an operation of the portable media player when said determining (b) determines that the acceleration is substantial, wherein the operation includes a read/write operation from the disk drive, and wherein said altering of the operation operates to defer the read/write operation and reset the failure count; and
(d) repeating the determining (b).

38. A method as recited in claim 37, wherein the acceleration of the portable media player pertains to vibration of the portable media player.

39. A method as recited in claim 37, wherein the portable media player further includes an acceleration monitor, and wherein said evaluating (a) of the acceleration is based on information provided by the acceleration monitor.

40. A method as recited in claim 37, wherein the operation is a read/write operation from the disk drive, and wherein said altering (c) of the operation operates to stop or prevent the read/write operation if the determining (d) determines that the acceleration is substantial.

41. A method as recited in claim 37, wherein the operation is a read/write operation from the disk drive, and wherein said altering (c) of the operation operates to slow a rate at which the read/write operation is retried.

42. A method as recited in claim 37, wherein said method further comprises:
(e) initiating user feedback when said determining (b) determines that the acceleration is substantial.

43. A method as recited in claim 42, wherein the user feedback is at least one of auditory, tactile, and visual.

44. A method as recited in claim 42, wherein the user feedback alerts the user that the portable media player is undergoing substantial accelerations.

45. A method as recited in claim 42, wherein the user feedback is a predetermined audible message.

46. A method as recited in claim 42, wherein the user feedback is an artificial skip sound that is presented to the user.

47. A method as recited in claim 37, wherein the operation is unrelated to the disk drive.

48. A method as recited in claim 1, wherein said altering (c) of the operation is dependent on past or expected usage behaviors.

49. A computer readable medium encoded with computer program code for operating a portable media player having media stored on a disk drive, said computer readable medium comprising:
computer program code for evaluating acceleration of the portable media player by utilizing at least a failure count, wherein the failure count represents a number of consecutive failed read operations from the disk drive;
computer program code for determining whether the acceleration is substantial based at least on whether the failure count exceeds a threshold level, wherein the acceleration is substantial when the failure count exceeds the threshold level;
computer program code for altering an operation of the portable media player when said computer code for determining whether the acceleration determines that the acceleration is substantial, wherein the operation includes a read/write operation from the disk drive, and wherein said altering of the operation operates to defer the read/write operation and reset the failure count;

computer code for determining if the acceleration is substantial based upon the reset failure count.

50. A computer readable medium as recited in claim 49, wherein the acceleration of the portable media player pertains to vibration of the portable media player.

51. A computer readable medium as recited in claim 49, wherein the portable media player further includes an acceleration monitor, and wherein said computer program code for evaluating evaluates the acceleration based on information provided by the acceleration monitor.

52. A computer readable medium as recited in claim 49 wherein the operation is a read/write operation from the disk drive, and wherein said computer program code for altering the operation operates to defer the read/write operation until after the substantial acceleration substantially cease.

53. A computer readable medium as recited in claim 49, wherein the operation is a read/write operation from the disk drive, and wherein said computer program code for altering the operation operates to slow a rate at which the read/write operation is retried.

54. A computer readable medium as recited in claim 49, wherein said computer readable medium further comprises:

computer program code for initiating user feedback when said computer program code for determining determines that the acceleration is substantial.

55. A portable media player, comprising:

a storage disk drive that stores media content for each of a plurality of media items;

an acceleration monitor that monitors acceleration of said portable media player;

a cache that temporarily stores the media content for a subset of the plurality of media items stored on said storage disk drive; and a processor operatively connected to said storage disk drive, said acceleration monitor and said cache, said processor controls said portable media player to play the media content from said cache and to refresh the media content in said cache by storing the media content for another subset of the plurality of media items stored on said disk drive, wherein said processor controls said portable media player to evaluate the acceleration of said portable media player by utilizing at least a failure count, wherein the failure count represents a number of consecutive failed read operations from the storage disk drive, wherein the acceleration is substantial when at least the failure count exceeds a threshold level, and wherein when the acceleration is substantial, the processor operates to defer a read operation of the stored media items and reset the failure count, and wherein said processor operates to produce a user feedback when said portable media player is undergoing substantial acceleration.

56. A portable media player as recited in claim 55, wherein said portable media player is battery-operated.

57. A portable media player as recited in claim 56, wherein said portable media player is pocket-sized that fits into a garment pocket.

58. A portable media player as recited in claim 55, wherein said storage disk drive provides magnetic data storage.

59. A portable media player as recited in claim 55, further comprising:

a display device that is a liquid crystal display with a light-emitting diode backlight.

60. A portable media player as recited in claim 55, wherein said portable media player comprises an audio player, and wherein the media content for the media items includes at least audio files of songs.

61. A portable media player as recited in claim 55, wherein said portable media player comprises a video player, and wherein the media content for the media items includes at least video files of videos.

62. A portable media player as recited in claim 55, wherein said portable media player comprises an image viewer, and wherein the media content for the media items includes at least image files of images.

63. A portable media player as recited in claim 55, wherein said portable media player further comprises:

a user input device that enables a user of said portable media player to at least select a particular media item from the plurality of media items through a rotational action with respect to said user input device.

64. A portable media player as recited in claim 63, wherein said processor controls said portable media player to load said cache from said storage disk drive with at least a portion of the media content of the particular media item that was selected using said user input device.

65. A portable media player as recited in claim 64, wherein said user input device comprises a rotary dial or a touchpad.

* * * * *